Patented Aug. 29, 1950

2,520,735

UNITED STATES PATENT OFFICE 2,520,735

SYNTHETIC RUBBER COMPOSITION CONTAINING A FATTY ACID NITRILE OR POLYMER THEREOF AND METHOD OF MAKING THE SAME

Anderson W. Ralston and Hoyt M. Corley, Chicago, Ill., assignors to Armour and Company, Chicago, Ill., a corporation of Illinois No Drawing. Continuation of application Serial No. 435,134, March 18, 1942. This application March 6, 1948, Serial No. 13,514

17 Claims. (Cl. 260—32.4)

This invention relates to synthetic elastomers and it comprises synthetic elastomers containing high molecular weight aliphatic nitrile compounds, and processes for preparing the same; it further comprises synthetic elastomers containing nitriles combined with monomers of the type capable of forming elastomers on polymerization, the nitriles being those derived from fatty acids and having at least twelve carbon atoms.

The development of synthetic elastomers, such as so-called synthetic rubbers, has created many problems respecting ways of compounding such elastomers as well as ways of making them. In the early development of so-called synthetic rubber, efforts were made to reproduce natural rubber synthetically. In later years, however, it has been discovered that rubber-like polymers could be prepared which have characteristics quite different from ordinary natural rubber and that such characteristics or properties particularly suit these synthetic products for many uses to which rubber itself was not well adapted. For example, many of these synthetic elastomers have high oil resistance, much higher than that of natural rubber. Consequently, such synthetic products can be used in many relations where natural rubber is at a distinct disadvantage.

In order to form a useful rubber product, it is necessary to admix with these elastomers substances which serve to soften, extend or plasticize them or to impart other desirable properties. Plasticizers, softeners and the like have also been added to natural rubber, but the agents used with natural rubber are not in many instances adaptable for compounding synthetic rubbers.

We have now discovered a class of organic compounds which are particularly useful in the compounding of synthetic elastomers. These compounds can be generally defined as aliphatic nitriles having at least twelve carbon atoms. The nitriles which we use in the practice of our invention may be derived from fatty acids by processes now well known in the art. Such fatty acid nitriles can be either saturated or unsaturated, but preferably should be unsaturated. We desire to clearly distinguish our invention from the use of lower molecular weight nitriles, such as acrylonitrile. However, acrylonitrile, when co-polymerized with butadiene, forms a synthetic elastomer to which our nitriles can be added in the compounding of such synthetic polymer.

Among the synthetic elastomers to which we can add aliphatic nitriles may be mentioned the following: butadiene polymers as such, usually made by polymerizing butadiene (having the structure $CH_2=CH-CH=CH_2$) with sodium; butadiene co-polymers, such as those made by polymerizing a mixture of butadiene and styrene, or butadiene and acrylonitrile; isoprene polymers; chloroprene polymers; polyisobutylene; and the like. Our nitriles can also be used for compounding those rubber-like products known as the Thiokols made from ethylene dichloride, or dichloroethyl ether, and sodium sulfides.

All of the above listed synthetic elastomers are substances having rubber-like characteristics although the elasticity may vary markedly and, in fact, can be controlled as desired.

In all instances the nitriles of our invention can be admixed with the synthetic elastomers in the compounding thereof to give articles of commerce.

The nitriles embraced within our invention are all those nitriles having twelve or more carbon atoms including that of the nitrile radical. Such nitriles are as follows: oleonitrile, linoleonitrile, linolenonitrile, erucqnitrile, stearonitrile, lauronitrile, elaidonitrile, brassidonitrile, palmitoleonitrile, and mixtures thereof. Desirably, we can use mixtures of nitriles prepared from natural oils and fats such as fish oils, cottonseed oil, soya bean oil, lard, tallow, etc. In the list above given oleonitrile and linoleonitrile may be regarded as illustrative of the unsaturated fatty acid nitriles.

We have discovered that all of these nitriles are compatible with synthetic elastomers and that incorporating these nitriles in the elastomers aids markedly in the compounding thereof with sulfur, vulcanization accelerators, and the like.

Indeed it is believed that these nitriles do more than merely modify the elastomer. Nitriles of the character specified undergo polymerization, and sulfur is a polymerizing agent which will convert the nitriles to polymerized products. Thus, for example, a mixture of 90 parts of a butadiene-styrene co-polymer with 25 parts of oleonitrile, together with sulfur and accelerators, gives a vulcanized product having soft, rubbery properties superior to that obtained when the butadiene-styrene co-polymer is vulcanized in the absence of the oleonitrile. We believe that the oleonitrile polymerizes to some extent in the presence of the sulfur and that the nitrile forms a kind of co-polymer with other constituents present.

Polymerized nitriles as such can be used to special advantage in the compounding of synthetic elastomers according to our invention. Such polymerized nitriles may be made by subjecting fatty acid nitriles to the action of polymerizing catalysts as fully described in the Ralston Patent 2,175,092.

The use of our nitriles in compounding synthetic elastomers is particularly important from the point of view of economizing on the amount of elastomer in the final compound. This is because these nitriles, particularly the polymerized nitriles, act as extenders, thus enabling us to prepare satisfactory rubber-like products containing a smaller proportion of the elastomer than has hitherto been considered necessary. For example, as much as 50% of an unsaturated nitrile, like linoleonitrile, can be admixed with the synthetic elastomer to give a product which can be vulcanized as desired, yet the availability of the nitrile polymer, or unpolymerized fatty acid nitrile, is much greater than that of the elastomer, and the cost is much less. Also where our improved synthetic elastomers are used in combination with natural rubber, it is possible to use a smaller proportion of natural rubber than is necessary where our invention is not employed.

We shall now give examples of ways of combining the nitriles of the preesnt invention with synthetic elastomers.

Example 1

100 parts of butadiene-styrene co-polymer of the Buna S type are milled with 25 parts of oleonitrile, 5 parts of sulfur, and 5 parts of zinc oxide, together with any suitable accelerator. This entire mass is thoroughly blended and then vulcanized in the usual way. The product has high water resistance, oil resistance, and resistance to abrasion.

Example 2

To the butadiene-styrene co-polymer of Example 1 we add, after incorporating the nitrile, from 50 to 75 parts by weight of carbon black and about 3 parts by weight of stearic acid. The resulting vulcanizing mixture is suitable for tire treads.

Example 3

100 parts of a butadiene-acrylonitrile polymer classified as Buna N was mixed with 25 parts of polymerized nitriles, 5 parts of sulfur, 50 parts of carbon black, 3 parts of stearic acid and a small amount of accelerator. The polymerized nitriles were prepared from lard fatty acid nitriles and were made by heating 100 parts of lard fatty acid nitriles with 5 parts by weight of aluminum chloride for 17 hours at 140° C. They were washed several times with water and dried before use.

The mixture of polymerized butadiene-acrylonitrile with the polymerized nitriles and the other ingredients mentioned above was mixed until the product became homogeneous. It was then heated to 140° C. for one hour. The product was a rubber-like substance, possessing elasticity and flexibility. It has many of the properties of ordinary vulcanized rubber.

Example 4

100 parts of a hydrocarbon polymer prepared by polymerization of butadiene in the presence of sodium were mixed with 25 parts of a polymerized nitrile, 5 parts of sulfur, 50 parts of carbon, 3 parts of stearic acid and a small amount of accelerator. These ingredients were mixed until the mixture became homogeneous. The mixture was then heated for a period of 1 hour at 140° C. After this treatment the product was a quite elastic, rubber-like substance. It had many of the properties of a vulcanized natural rubber product.

The nitriles used in this example were prepared by the pyrolysis of stearonitrile. 100 parts of stearonitrile were mixed with 2 parts by weight of phosphorus pentasulfide and the mixture heated for 15 hours at 130° C. This resulted in a thick oil which consisted essentially of a mixture of polymerized nitriles. This mixture was washed with water to remove soluble compounds and was then dried by heating under a vacuum. It was then used as an ingredient in the polymerized hydrocarbon mixture as described above.

Example 5

100 parts of polymerized chloroprene (2-chlorobutadiene) was mixed with 15 parts of linoleonitrile, 5 parts of sulfur and a small amount of diphenyl guanidine. These ingredients were mixed together until the mixture became homogeneous. The mixture was then heated for one hour at 140° C. This resulted in a product having excellent elasticity and possessing many of the properties of a vulcanized natural rubber.

Example 6

100 parts of polymerized vinyl chloride were mixed with 25 parts of chlorinated oleonitrile and 5 parts of sulfur. These ingredients were mixed until a homogeneous product resulted. The product was then heated for one hour at 130° C. This resulted in a flexible, transparent product which had many of the properties of a natural rubber product.

Another important way of incorporating aliphatic nitriles derived from fatty acids in synthetic elastomers is one in which the nitrile is incorporated with the elastomer during the process of forming the latter. Most of these synthetic compounds are prepared by polymerizing the polymerizable constituents while emulsified in water. For example, butadiene and styrene are emulsified in water containing a polymerization catalyst and then the mixture is subjected to polymerizing conditions, such as elevated temperature. Thereafter the co-polymer thus formed is separated from the emulsion by coagulation. In practicing this feature of our invention we emulsify the nitrile along with the other constituents and polymerize the entire mixture in one step. Thus we avoid the necessity for separately milling or otherwise compounding the aliphatic nitriles with the elastomer. Moreover, we gain the benefits of a homogeneous coagulum in which we believe the nitrile is co-polymerized with other constituents.

For example, we emulsify about 70 parts by weight of butadiene, 30 parts by weight of styrene, or acrylonitrile, 4 parts by weight of an emulsifying agent, one-half part by weight of a polymerizing catalyst, such as hydrogen peroxide, sodium perborate, or other peroxide, 20 parts by weight of stearonitrile or oleonitrile, and 200 parts by weight of water. This mixture is then heated to a temperature of about 50° C. Over a period of about twelve to eighteen hours to give a synthetic latex in which the rubber-like elastomer has been combined with the nitrile. Thereafter the latex can be coagulated in the usual way to recover a solid rubber, or the latex can be processed for the manufacture of useful articles as such.

The foregoing detailed description has been given for purposes of explanation only and it is expected that many changes may be made therein and the procedures given may be varied to accommodate specific conditions of operation, all within the spirit of our invention.

This application is a continuation of our application Serial No. 435,134, filed March 18, 1942, now abandoned.

What we claim as new and desire to secure by Letters Patent is:

1. A process for preparing a synthetic elastomer composition comprising mixing a fatty acid nitrile of at least 12 carbon atoms with butadiene, and thereafter polymerizing the mixture to form a synthetic elastomer composition.

2. A process for preparing a synthetic elastomer composition comprising mixing a fatty acid nitrile of at least 12 carbon atoms with butadiene and acrylonitrile, and thereafter polymerizing the mixture to form a synthetic elastomer composition.

3. A composition of matter comprising a synthetic rubber prepared by the polymerization of butadiene, and, as a softener therefor, a fatty acid nitrile containing at least 12 carbon atoms.

4. A composition of matter comprising a synthetic rubber prepared by the polymerization of butadiene and acrylonitrile, and, as a softener therefor, a fatty acid nitrile containing at least 12 carbon atoms.

5. A composition of matter comprising a synthetic rubber prepared by the polymerization of butadiene, and, as a softener therefor, an unsaturated fatty acid nitrile containing at least 12 carbon atoms.

6. A composition of matter comprising a synthetic rubber prepared by the polymerization of butadiene and acrylonitrile, and, as a softener therefor, an unsaturated fatty acid nitrile containing at least 12 carbon atoms.

7. A composition of matter comprising a synthetic elastomer prepared by the polymerization of butadiene and styrene, and, as a softener therefor, a fatty acid nitrile having at least 12 carbon atoms.

8. A composition of matter comprising synthetic rubber prepared by the polymerization of butadiene-1,3 and, as a softener therefor, 9-octadecene nitrile.

9. A composition of matter comprising a synthetic elastomer prepared by the polymerization of butadiene-1,3 and acrylonitrile and, as a softener therefor, 9-octadecene nitrile.

10. A synthetic elastomer prepared by the polymerization of a composition selected from the class consisting of butadiene polymers, isoprene polymers, chloroprene polymers, and polyisobutylene, said synthetic elastomer containing a fatty acid nitrile having at least 12 carbon atoms.

11. A composition as set forth in claim 10 wherein said composition is a vulcanized material.

12. A composition as set forth in claim 10 wherein said nitrile is unsaturated.

13. A composition as set forth in claim 10 wherein said nitrile is oleonitrile.

14. A process for preparing a synthetic elastomer composition comprising mixing a fatty acid nitrile of at least 12 carbon atoms, sulphur and a synthetic substance of the class consisting of butadiene elastomers, isoprene elastomers, chloroprene elastomers, and elastomeric polyisobutylene and heating the mixture to form a synthetic elastomer composition.

15. A process for preparing a synthetic elastomer composition comprising mixing a fatty acid nitrile having at least 12 carbon atoms with a substance selected from the class consisting of butadiene elastomers, isoprene elastomers, chloroprene elastomers, and elastomeric polyisobutylene and heating the mixture to form a synthetic elastomer composition.

16. A process for preparing a synthetic elastomer composition comprising mixing a fatty acid nitrile of at least 12 carbon atoms with a monomer which is capable of polymerization to form synthetic elastomer substances of the class consisting of butadiene polymers, isoprene polymers, chloroprene polymers, and polyisobutylene, and thereafter polymerizing the mixture to form a synthetic elastomer composition.

17. A synthetic elastomer prepared by the polymerization of a composition selected from the class consisting of butadiene polymers, isoprene polymers, chloroprene polymers, and polyisobutylene, said synthetic elastomer containing a member selected from the group consisting of fatty acid nitriles having at least 12 carbon atoms and the polymers thereof.

ANDERSON W. RALSTON.
HOYT M. CORLEY.

REFERENCES CITED

The following references are of record in the file of this patent:

UNITED STATES PATENTS

| Number | Name | Date |
| --- | --- | --- |
| 2,175,092 | Ralston | Oct. 3, 1939 |

OTHER REFERENCES

Wakeman: The Chemistry of Commercial Plastics; Reinhold, 1947, pages 319 and 402.